United States Patent
Shibata

(10) Patent No.: US 8,427,907 B2
(45) Date of Patent: Apr. 23, 2013

(54) CLOCK DEVICE AND COMPUTER-READABLE RECORD MEDIUM STORING PROGRAM FOR IMPLEMENTING THE SAME

(75) Inventor: Hiroshi Shibata, Kariya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 638 days.

(21) Appl. No.: 12/563,612

(22) Filed: Sep. 21, 2009

(65) Prior Publication Data
US 2010/0083025 A1 Apr. 1, 2010

(30) Foreign Application Priority Data
Sep. 30, 2008 (JP) ................................ 2008-254030

(51) Int. Cl.
 *G04C 11/00* (2006.01)
(52) U.S. Cl.
 USPC ............................................. 368/46; 368/47
(58) Field of Classification Search ............... 368/46–47
 See application file for complete search history.

(56) References Cited

U.S. PATENT DOCUMENTS

| 4,633,421 | A | * | 12/1986 | Watson et al. ................... 702/59 |
| 5,469,411 | A | * | 11/1995 | Owen ............................. 368/47 |
| 5,528,560 | A | | 6/1996 | Ogiyama |
| 5,940,458 | A | * | 8/1999 | Suk ............................... 375/376 |
| 6,199,169 | B1 | | 3/2001 | Voth |
| 6,219,303 | B1 | * | 4/2001 | Morohoshi et al. ............. 368/47 |
| 6,351,821 | B1 | | 2/2002 | Voth |
| 6,563,765 | B1 | * | 5/2003 | Ishigaki .......................... 368/47 |
| 7,411,870 | B2 | * | 8/2008 | Murata et al. ................... 368/47 |
| 2002/0069299 | A1 | | 6/2002 | Rosener et al. |
| 2003/0048811 | A1 | | 3/2003 | Robie, Jr. et al. |
| 2006/0067166 | A1 | * | 3/2006 | Murata et al. .................. 368/47 |
| 2008/0239880 | A1 | * | 10/2008 | Murata et al. .................. 368/47 |

FOREIGN PATENT DOCUMENTS

| JP | 05-142365 | | 6/1993 |
| JP | 07-159559 | A | 6/1995 |
| JP | 2003-110562 | | 4/2003 |
| JP | 2007-214670 | | 8/2007 |
| JP | 2008-051761 | | 3/2008 |
| WO | 02-44877 | A1 | 6/2002 |

OTHER PUBLICATIONS

Extended European Search Report dated Nov. 11, 2010 in Application No. 09252276.2.

(Continued)

*Primary Examiner* — Sean Kayes
(74) *Attorney, Agent, or Firm* — Banner & Witcoff, Ltd.

(57) ABSTRACT

A clock device acquires time information representing present time from an external device at preset time intervals, corrects time of an internal clock based on the time information, calculates an error of the time of the internal clock based on the present time represented by the time information, and changes a first set value of the time interval based on the error. The changing updates the first set value to a second set value, which is m times the first set value when the error is smaller than a first threshold value, while updating the first set value to a second set value, which is n times the set value when the error is larger than a second threshold value larger than the first threshold value (m, n: positive values satisfying m>1, n<1 and m·n≠1).

18 Claims, 6 Drawing Sheets

OTHER PUBLICATIONS

Kasch W, et al: "The Network Time Protocol Version 4 Algorithm Specification: draft-ietf-ntp-ntpv4-algorithms-0I" IETF Standard-Working-Draft, Internet Engineering Task Force, IETF, Nov. 9, 2005, pp. 1-25.

JP Office Action dtd Jul. 27, 2010, JP Appln. 2008-254030, English translation.

JP Office Action dtd Apr. 5, 2011, JP Appln. 2008-254030, English translation.

* cited by examiner

CLOCK DEVICE AND COMPUTER-READABLE RECORD MEDIUM STORING PROGRAM FOR IMPLEMENTING THE SAME

CROSS-REFERENCE TO RELATED APPLICATION

This application claims priority under 35 U.S.C. §119 from Japanese Patent Application No. 2008-254030 filed on Sep. 30, 2008. The entire subject matter of the application is incorporated herein by reference.

BACKGROUND

1. Technical Field

The present invention relates to a clock device and a computer-readable record medium storing a program for implementing a clock device.

2. Related Art

Clock devices capable of acquiring time information representing the present time from an external device and correcting its own time (the time kept by the clock device) based on the acquired time information, are well known today. Specifically, clock devices acquiring the time information from a time server via a network are widely known.

In a well-known technology for a clock device for acquiring the time information from an external device and correcting its own time based on the acquired time information, the timing for acquiring the time information is controlled based on the error of the time kept by the clock device with respect to the present time represented by the time information acquired from the external device. For example, a technology shortening the time interval of the acquisition of the time information when the error is large and a technology extending the time interval when the error is small are widely known.

However, the conventional technology involves the following problems:

For example, in a technology for a clock device acquiring the time information from a time server at fixed time intervals and correcting its own time based on the acquired time information, the error of an internal clock of the clock device can become extremely large in cases where the timekeeping accuracy of the internal clock is lower than an estimated accuracy since the clock device makes the time correction at fixed time intervals based on the estimated time accuracy of the internal clock irrespective of the error of the internal clock.

Further, in cases where an internal clock whose timekeeping accuracy is unstable (e.g. software clock) is corrected, it is impossible to precisely predict the extent of the error occurring with the passage of time, and thus it is difficult to properly set the time interval for the acquisition of the time information.

In other words, the time information acquisition interval has to be set at a short time so that the error of the internal clock can be kept within a permissible range even when the timekeeping accuracy of the internal clock is at its worst (since the extent of the error occurring with the passage of time can not be predicted precisely). In this case, the load on the time server or the network can become extremely heavy.

Even though there exists a technology adjusting the time interval for the acquisition of the time information from the time server based on the error of the internal clock, the conventional technology (making a simple adjustment like just shortening the time interval when the error is large and extending the time interval when the error is small) is incapable of stabilizing the error of the internal clock, and consequently, the time information acquisition interval is necessitated to change frequently.

SUMMARY

For example, in cases where a time information acquisition interval corresponding to each error level (extent of the error) is previously set uniquely and the acquisition of the time information from the time server is carried out according to the time interval corresponding to the actual error level, the time interval can become too long or too short for the actual error level if the preset correspondence relationship between the error level and the time interval is incorrect.

Thus, in the case where the correspondence relationship is incorrect, the error of the internal clock becomes unstable and the time information acquisition interval is changed frequently. Further, when an internal clock whose error varies frequently and widely is used, it is impossible from the very beginning to previously figure out a precise correspondence relationship between the error level and the time information acquisition interval.

Aspects of the present invention are advantageous in that a clock device can be provided which acquires the time information from an external device and corrects its own internal clock based on the acquired time information, and is capable of realizing an efficient time correction operation by accommodating the error of the internal clock within a desired range (permissible range) and stabilizing the time information acquisition interval.

In accordance with aspects of the present invention, there is provided a clock device, comprising an internal clock which keeps the time, a time information acquisition unit which acquires time information representing present time from an external device at preset time intervals, a time correction unit which corrects the time kept by the internal clock based on the time information, an error calculation unit which calculates an error of the time kept by the internal clock based on the present time represented by the time information, and a setting change unit which changes the set value of the time interval for the acquisition of the time information by the time information acquisition unit based on the error calculated by the error calculation unit. The setting change unit updates the set value of the time interval to m times the currently set value when the error is smaller than a first threshold value. The setting change unit updates the set value of the time interval to n times the currently set value when the error is larger than a second threshold value, the second threshold value being larger than the first threshold value. The multiplying factors m and n are positive values satisfying conditions m>1, n<1 and m·n≠1.

With the clock device configured as above, the set value of the time interval (for the acquisition of the time information by the time information acquisition unit) can be successively updated properly so that the error of the internal clock is kept within a permissible range (first threshold value≦error≦second threshold value).

In accordance with aspects of the present invention, there is also provided a computer-readable record medium storing computer-readable instructions that cause a computer to execute a time information acquisition step of acquiring time information representing present time from an external device at preset time intervals, a time correction step of correcting time kept by an internal clock based on the time information, an error calculation step of calculating an error of the time kept by the internal clock based on the present time represented by the time information, and a setting change step of changing the set value of the time interval for the acquisition of the time information by the time information acquisition step based on the error calculated by the error calculation step. The setting change step updates the set value of the time interval to m times the currently set value when the error is smaller than a first threshold value. The setting change step updates the set value of the time interval to n times the currently set value when the error is larger than a second threshold value, the second threshold value being larger than the first threshold value. The multiplying factors m and n are positive values satisfying conditions $m>1$, $n<1$ and $m \cdot n \neq 1$.

Other objects, features and advantages of the present invention will become more apparent from the consideration of the following detailed description taken in conjunction with the accompanying drawings.

BRIEF DESCRIPTION OF THE ACCOMPANYING DRAWINGS

DETAILED DESCRIPTION OF THE EMBODIMENTS

Figure 1:
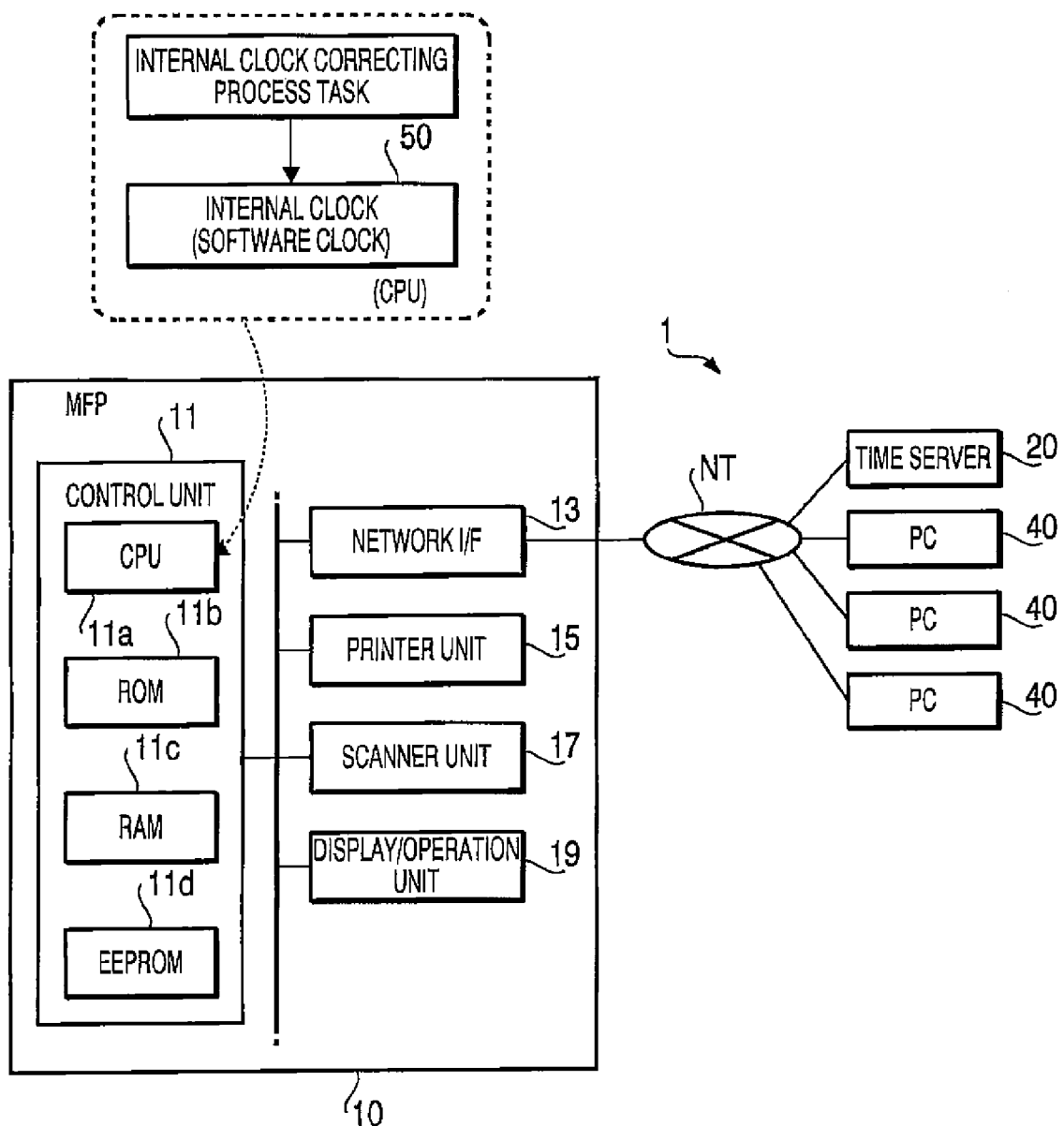
FIG. 1 is a block diagram showing the configuration of a communication system (including a digital MFP equipped with a clock device) in accordance with an embodiment of the present invention.

Referring now to the drawings, a description will be given in detail of a preferred embodiment in accordance with the present invention.

A communication system 1 (see FIG. 1) in accordance with an embodiment includes a digital MFP (Multi-Function Peripheral) 10, a time server 20 and PCs (Personal Computers) 40 which are connected to a network NT.

The digital MFP 10 in the communication system 1 includes a control unit 11, a network interface 13, a printer unit 15, a scanner unit 17 and a display/operation unit 19.

The control unit 11 includes a CPU (Central Processing Unit) 11a which executes various programs, a ROM 11b storing the programs to be executed by the CPU 11a, a RAM 11c which is used as a work area during the program execution by the CPU 11a, and an EEPROM (Electrically Erasable Programmable ROM) 11d which is used for storing a variety of setting information. The CPU 11a has centralized control of the whole device (MFP 10) by executing the programs stored in the ROM 11b, by which various functions of the MFP 10 are implemented.

The network interface 13, which is connected to the network NT, is configured to be capable of communicating with external devices (time server 20, PC 40, etc.) via the network NT.

The printer unit 15 forms (prints) an image on a sheet (e.g. paper) according to image data supplied from the control unit 11.

The scanner unit 17 optically scans a document (target of scanning) placed on a document table or fed from an ADF (Automatic Document Feeder) and thereby generates image data representing the scanned image. The image data generated by the scanner unit 17 is inputted to the control unit 11.

The display/operation unit 19, including an LCD (Liquid Crystal Display) monitor for displaying information and various operation keys, functions as a user interface.

The control unit 11 implements the so-called network printer function, scanner function and copy function by use of the printer unit 15, the scanner unit 17 and the display/operation unit 19.

For example, the control unit 11 implements the network printer function by receiving image data (target of printing) from a PC 40 on the network NT via the network interface 13 and inputting the received image data to the printer unit 15.

When a scan instruction is inputted by the user through the display/operation unit 19, the control unit 11 acquires image data (representing an image on a document) by making the scanner unit 17 scan the document and then transmits the acquired image data to a preset external device (destination) via the network interface 13 according to the setting information stored in the EEPROM 11d, by which the scanner function is implemented.

When a copy instruction is inputted by the user through the display/operation unit 19, the control unit 11 acquires image data (representing an image on a document) by making the scanner unit 17 scan the document and then inputs the acquired image data to the printer unit 15 to make the printer unit 15 form the copy image of the document on a sheet, by which the copy function is implemented.

Besides the above functions, the MFP 10 has a function of acquiring time data (representing the present time) from the time server 20 via the network interface 13 and correcting the time kept by its own internal clock 50 based on the acquired time data (internal clock correcting function).

The internal clock correcting function is implemented by the control unit 11 by executing a program stored in the ROM 11b.

In the following, an internal clock correcting process executed by the control unit 11 will be explained referring to a flow chart of FIG. 2. The control unit 11 starts the internal clock correcting process immediately after startup (turning ON) of the MFP 10.

At the start of the internal clock correcting process, the control unit 11 executes an initialization process. Specifically, a data acquisition interval INT (parameter representing the time interval of the acquisition of the time data) is set at an initial value INT0 (S110).

After finishing the initialization process (S110), the control unit 11 acquires the time data (representing the present time) from the time server 20 via the network interface 13 (S120). As is generally known, the time server 20 receiving a time data request signal sends back the time data (representing the present time) as a reply signal to the sender of the request signal.

An address of the time server 20 has been prestored in the EEPROM 11d of the control unit 11. The control unit 11 transmits the time data request signal to the address (time server 20) via the network interface 13, receives the time data (transmitted from the time server 20 as the reply signal) via the network interface 13, and corrects the present time Tn kept by the internal clock 50 by updating the present time Tn to present time Ts represented by the received time data (S130). Incidentally, the internal clock 50 (target of the correction) in this embodiment is a well-known software clock (implemented by the CPU 11a by executing a program) as shown in the upper part of FIG. 1. The software clock keeps the present time Tn by counting clock signals which are inputted from an oscillator to the CPU 11a.

Explanation of the program implementing the software clock is omitted here since such a program is widely available as a program forming a part of the operating system. Thus, the control unit 11 activates the operating system stored in the ROM 11b at start up of the MFP 10 and implements the software clock function while also executing the internal clock correcting process under the management by the operating system.

After correcting the present time Tn of the internal clock 50 as above (S130), the control unit 11 waits until a time (time period) corresponding to the current value (set value) of the parameter "data acquisition interval INT" passes since the correction of the present time Tn of the internal clock 50 (S140).

At the point when the time corresponding to the data acquisition interval INT has passed, the control unit 11 acquires the time data from the time server 20 again similarly to the step S120 (S150).

When the time data has been acquired from the time server 20 (S150), the control unit 11 calculates an error E of the internal clock 50 (based on the present time Ts represented by the acquired time data) before making the correction of the present time Tn kept by the internal clock 50 (S160). The error E is calculated as the absolute value (positive value) of the difference between the present time Tn indicated by the internal clock 50 and the present time Ts represented by the acquired time data as below.

$$E=|Ts-Tn| \quad (1)$$

After calculating the error E (S160), the control unit 11 corrects the present time Tn kept by the internal clock 50 to the present time Ts represented by the acquired time data similarly to the step S130 (S170).

After finishing the step S170, the control unit 11 judges whether the error E calculated in S160 is less than a preset lower limit Emin (S180). If the error E is less than the lower limit Emin (S180: YES), the control unit 11 updates the data acquisition interval INT to m times its current value (INT←m·INT) (S190) and thereafter advances to step S260. Incidentally, the multiplying factor m used in S190 is previously set in a designing phase at a positive value larger than 1 (m>1).

If the error E is not less than the lower limit Emin in S180 (S180: NO), the control unit 11 judges whether the error E calculated in S160 is larger than a preset upper limit Emax (S200).

If the error E is larger than the upper limit Emax (S200: YES), the control unit 11 updates the data acquisition interval INT to n times its current value (INT←n·INT) (S210) and thereafter advances to the step S260. Incidentally, the multiplying factor n used in S210 is previously set in the designing phase at a positive value less than 1 (n<1).

Specifically, the multiplying factors m and n are set in the designing phase to satisfy the following conditions:

$$m>1 \quad (2)$$

$$n<1 \quad (3)$$

$$m \cdot n < 1 \quad (4)$$

The reason why the multiplying factors m and n are set as above will be explained later referring to FIGS. 3A and 3B.

On the other hand, if the error E is within the upper limit Emax (Emin≦E≦Emax) in S200 (S200: NO), the control unit 11 advances to the step S260 without updating the data acquisition interval INT, that is, keeping the data acquisition interval INT at its current value.

Incidentally, the upper limit Emax and the lower limit Emin of the error E are set in the designing phase at positive values corresponding to a permissible range of the error E. In other words, the upper limit Emax and the lower limit Emin are set in the designing phase at the upper limit and the lower limit of the permissible range (which is set depending on the purpose of use of the internal clock 50), respectively.

In the step S260, the control unit 11 judges whether the data acquisition interval INT is larger (longer) than a upper limit Imax which has been preset in the designing phase. If the data acquisition interval INT is larger than the upper limit Imax (S260: YES), the control unit 11 sets the data acquisition interval INT at the upper limit Imax, that is, restricts the data acquisition interval INT to the upper limit Imax (S270), and thereafter returns to the step S140.

On the other hand, if the data acquisition interval INT is the upper limit Imax or less (S260: NO), the control unit 11 judges whether the data acquisition interval INT is less than a lower limit Imin which has been preset in the designing phase (S280).

If the data acquisition interval INT is less than the lower limit Imin (S280: YES), the control unit 11 sets the data acquisition interval INT at the lower limit Imin, that is, restricts the data acquisition interval INT to the lower limit Imin (S290), and thereafter returns to the step S140.

On the other hand, if the data acquisition interval INT is the lower limit Imin or more (S280: NO), the control unit 11 directly returns to the step S140.

The control unit 11 returning to the step S140 waits until the time corresponding to the current value of the data acquisition interval INT passes since the correction of the internal clock 50 in S170, and thereafter advances to the step S150. As above, in the internal clock correcting process, the correction of the internal clock 50 is made successively while changing the data acquisition interval INT (time interval of the acquisition of the time data) depending on the error E of the internal clock 50.

Next, examples of the update of the data acquisition interval INT (implemented by the above internal clock correcting process) and variations in the error E accompanying the update will be explained below referring to FIGS. 3A and 3B.

Figure 3A:
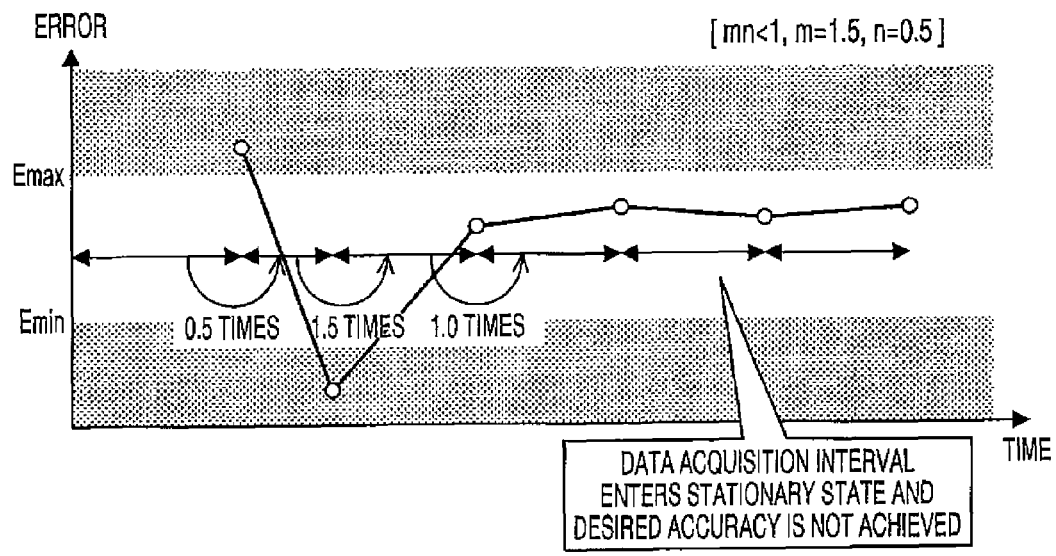
FIGS. 3A and 3B are graphs showing examples of update of a data acquisition interval NT and variations in an error E of an internal clock of the digital MFP accompanying the update when an internal clock correcting process is executed by the control unit.

FIG. 3A shows an example of the update of the data acquisition interval INT and the variations in the error E accompanying the update in a case where the condition m·n<1 is satisfied. FIG. 3B shows a comparative example of the update of the data acquisition interval NT and the variations in the error E accompanying the update in a case where m·n=1.

In this embodiment, the multiplying factors m and n are set in the designing phase to satisfy the condition m·n<1 as mentioned above since setting the multiplying factors m and n to satisfy m·n=1 can make it impossible to set the data acquisition interval INT at an appropriate value. Here, the "appropriate value" means a value of the data acquisition interval INT with which the error E can be accommodated in the permissible range (Emin≦E≦Emax).

Figure 3B:
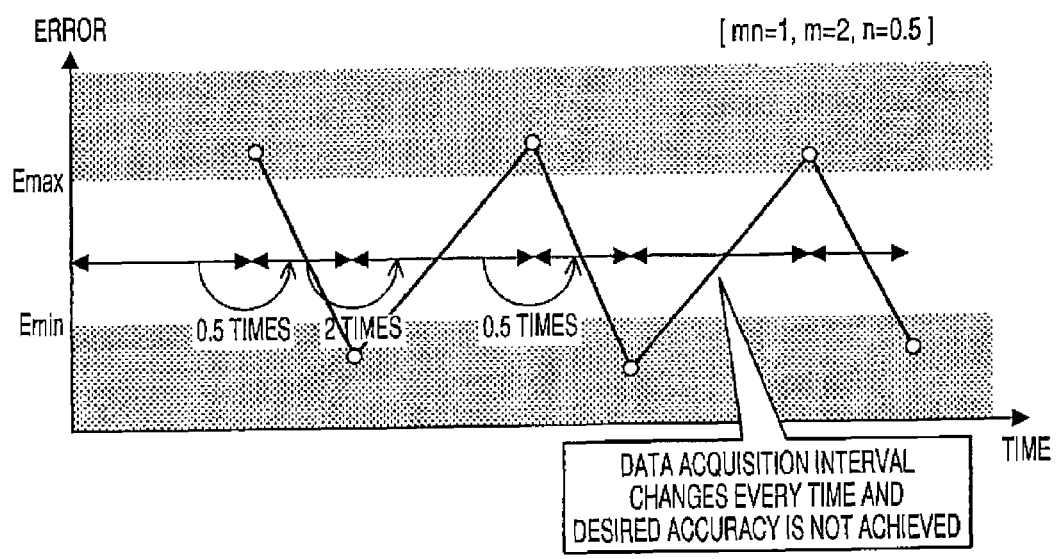

In the case where m·n=1, there is a possibility that the data acquisition interval INT keeps on alternately taking on two values as shown in FIG. 3B, since the number of possible values of the data acquisition interval NT (obtained by successively multiplying the data acquisition interval INT by m and n) is restricted (due to the relationship m·n=1) and the data acquisition interval INT can not be set at an appropriate value (i.e. the error E can not be accommodated in the permissible range).

In the example of FIG. 3B, the initial value INT0 of the data acquisition interval NT is larger than (i.e. too large to be) the "appropriate value", with which the error E exceeds the upper limit Emax and consequently the data acquisition interval INT is updated to a smaller value n·INT0. The updated data acquisition interval INT (n·INT0) is too small this time, with which the error E falls below the lower limit Emin.

In this case, even if the current value (n·INT0) of the data acquisition interval INT is multiplied by m (since the error E is less than the lower limit Emin), the data acquisition interval INT after the multiplication (update) equals m·n·INT0=INT0 (initial value).

Thus, even when the time data is acquired again according to the updated data acquisition interval INT, the error E exceeds the upper limit Emax again. As above, when the multiplying factors m and n are set to satisfy m·n=1, there is a possibility that the error E of the internal clock 50 is not accommodated in (or does not even enter) the permissible range (Emin≦E≦Emax) even though the data acquisition interval NT is successively adjusted based on the error E.

Such a phenomenon occurs similarly also when the initial value INT0 of the data acquisition interval INT is smaller than (i.e. too small to be) the "appropriate value". Specifically, the data acquisition interval INT just keeps on alternately taking on two values m·INT0 and INT0 without becoming stable and the error E is not accommodated in (or does not even enter) the permissible range (Emin≦E≦Emax).

As above, when m·n=1, there is a possibility that the data acquisition interval INT is changed frequently without converging.

On the other hand, by setting the multiplying factors m and n to satisfy the condition m·n<1, the data acquisition interval INT is allowed to take on various values, by which the probability of the error E remaining in the permissible range (Emin≦E≦Emax) and the probability of the convergence of the data acquisition interval INT are both increased.

For the reason explained above, the multiplying factors m and n are set to satisfy the condition m·n<1 in this embodiment. In the example of FIG. 3A, the condition m·n<1 is satisfied by setting the multiplying factors m and n at 1.5 and 0.5, respectively. With such setting of the multiplying factors m and n, the problem shown in FIG. 3B (the data acquisition interval INT keeping on alternately taking on two values) can be eliminated, the error E of the internal clock 50 can be kept in the permissible range (Emin≦E≦Emax), and the data acquisition interval INT can be stabilized.

Incidentally, even when the condition m·n<1 is not satisfied, the problem shown in FIG. 3B can be avoided by setting the multiplying factors m and n to satisfy the following condition (5):

$$m \cdot n \neq 1 \quad (5)$$

Thus, the multiplying factors m and n may also be set to satisfy the following condition (6) (instead of the aforementioned condition (4)):

$$m \cdot n > 1 \quad (6)$$

When the multiplying factors m and n are set to satisfy the condition m·n>1, the internal clock correcting process tends to stabilize the error E in an area above the center of the permissible range ((Emin+Emax)/2).

Thus, this setting of the multiplying factors m and n satisfying the condition m·n>1 is desirable in consideration of the load on the time server 20 (i.e. when the data acquisition interval INT is desired to be long).

However, in this case where the error E tends to be stabilized in the area above the center of the permissible range, the error E is likely to exceed the upper limit Emax of the permissible range (that is, the error E tends to be too large) when the appropriate value of the data acquisition interval INT has changed due to a change in the timekeeping accuracy of the internal clock 50. Thus, in order to avoid this kind of problem, the multiplying factors m and n are desired to be set to satisfy the condition m·n<1.

When the multiplying factors m and n are set to satisfy the condition m·n<1, the error E tends to be stabilized in an area below the center of the permissible range.

Therefore, by the setting of the multiplying factors m and n satisfying the condition m·n<1, the probability that the error E exceeds the upper limit Emax of the permissible range (when the appropriate value of the data acquisition interval INT has changed due to a change in the timekeeping accuracy of the internal clock 50) can be reduced even though the load on the time server 20 is higher compared to the case where the other condition m·n>1 is employed.

In the communication through the network NT, there are cases where a process such as cipher communication is executed by establishing time synchronization between nodes. If the error E (of an internal clock) exceeds the upper limit Emax of the permissible range in a device executing such a process, the device can not use present time of high accuracy required for the time synchronization, and consequently, the time synchronization between nodes can become impossible. Thus, in such cases, the multiplying factors m and n are desired to be set to satisfy the condition m·n<1.

Incidentally, even though the load on the time server 20 increases when the condition m·n<1 is employed as mentioned above, that is just a relative increase compared to the case where the other condition m·n>1 is employed; the technology of this embodiment is still capable of reducing the load on the time server 20 compared to the conventional technology.

Just for clarification, while the error E is stabilized in the area above the center of the permissible range in the example of FIG. 3A (which seems to be contradictory to the above explanation that the error E tends to be stabilized in the area below the center of the permissible range when the condition m·n<1 is employed), FIG. 3A does not contradict the explanation since the explanation is about the probability or tendency.

While the multiplying factors m and n are desired to be set to satisfy m·n≠1 as explained above, it is more desirable that the multiplying factors m and n be set to satisfy $m^p \cdot n^q \neq 1$ (p, q: arbitrary natural number). The example of FIG. 3A (m=1.5=3/2, n=0.5=1/2) satisfies the condition $m^p \cdot n^q \neq 1$.

While the setting of the multiplying factors m and n satisfying m·n≠1 can basically accommodate the error E in the permissible range and stabilize the data acquisition interval INT, a problem similar to the case where m·n=1 can occur theoretically when $m^2 \cdot n = 1$ or $n \cdot m^2 = 1$ is satisfied (even if m·n≠1 is satisfied).

While satisfying the condition $m^p \cdot n^q \neq 1$ is not necessarily a prerequisite for the stabilization of the data acquisition interval INT (since this kind of problem does not occur unless an extremely inappropriate value (far from the appropriate value) is set as the initial value INT0), the problem shown in FIG. 3B can be avoided more reliably by setting the multiplying factors m and n to satisfy the condition $m^p \cdot n^q \neq 1$.

The upper limit Imax and the lower limit Imin of the data acquisition interval INT (both positive) can be set in the designing phase as follows:

The lower limit Imin is a parameter used for adjusting the data acquisition interval INT so that the load on the time server 20 does not become excessive (even if the error E of the internal clock 50 increases). Thus, the lower limit Imin should be set in consideration of the load on the time server 20.

The upper limit Imax is a parameter used for preventing the error E from remaining too large (without being corrected) for a long time due to a too long data acquisition interval INT when the timekeeping accuracy of the internal clock 50 has changed. Thus, the upper limit Imax should be set in the designing phase in consideration of the stability of the internal clock 50 and effects on tasks that use the present time Tn kept by the internal clock 50.

While not mentioned in the above explanation, the technology of this embodiment can be employed for an MFP that executes Kerberos authentication, for example. As is widely known, the Kerberos authentication requires the time synchronization and high accuracy of the present time kept by the internal clock. Therefore, by employing the technology of this embodiment for such an MFP, the time correction can be made efficiently while also reducing the load on the time server 20.

In the case where the technology of this embodiment is employed for such an MFP, the upper limit Emax and lower limit Emin of the permissible range of the error E may be set at approximately 500 msec and 100 msec, for example. The upper limit Imax and lower limit Imin of the data acquisition interval INT may be set at approximately 1 week (168 hours) and 1 hour, for example.

<Modifications>

Figure 4:
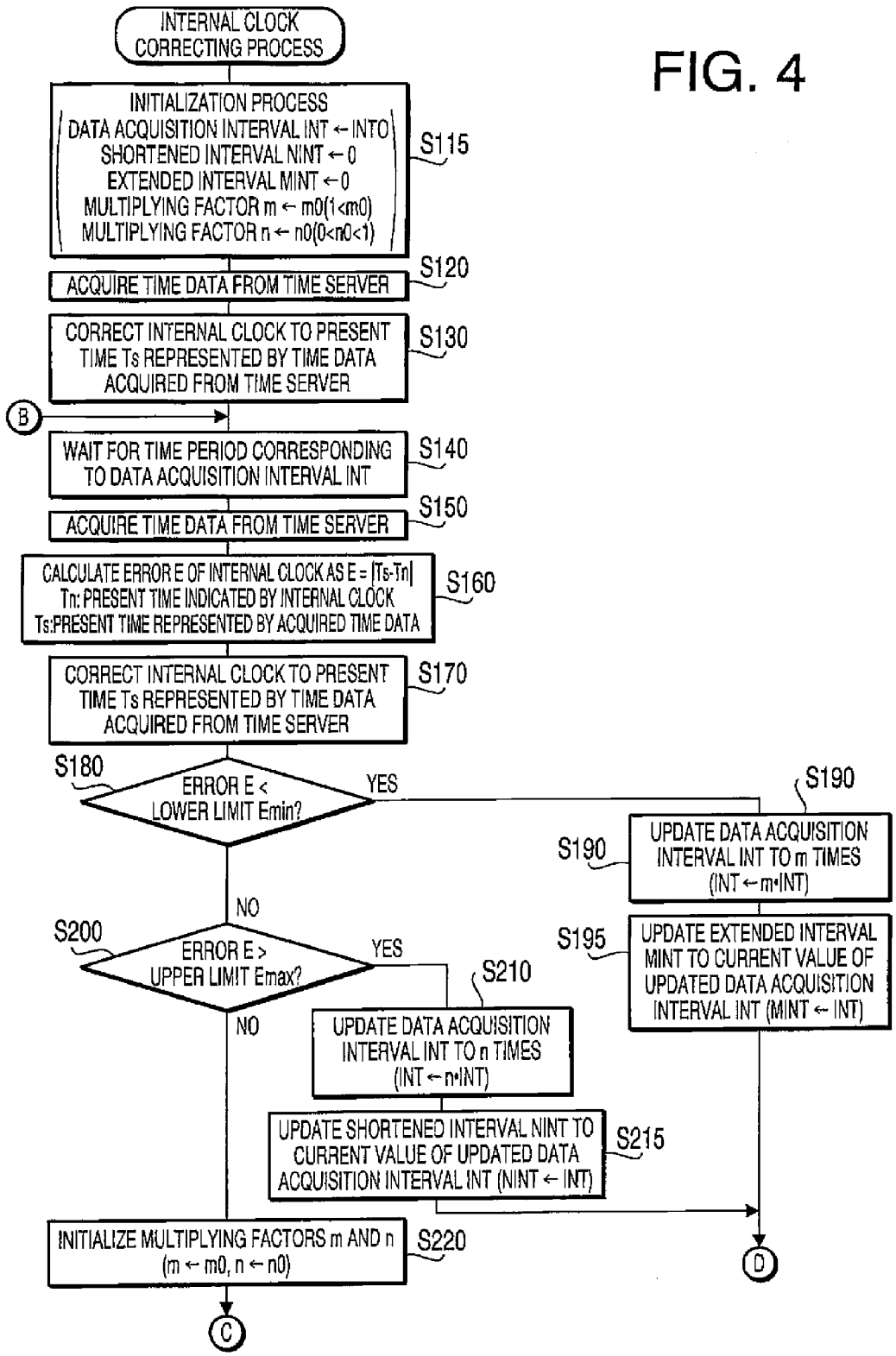
FIGS. 4 and 5 are flow charts showing an internal clock correcting process which is executed by a control unit of an MFP in accordance with a modification of the embodiment.
Figure 5:
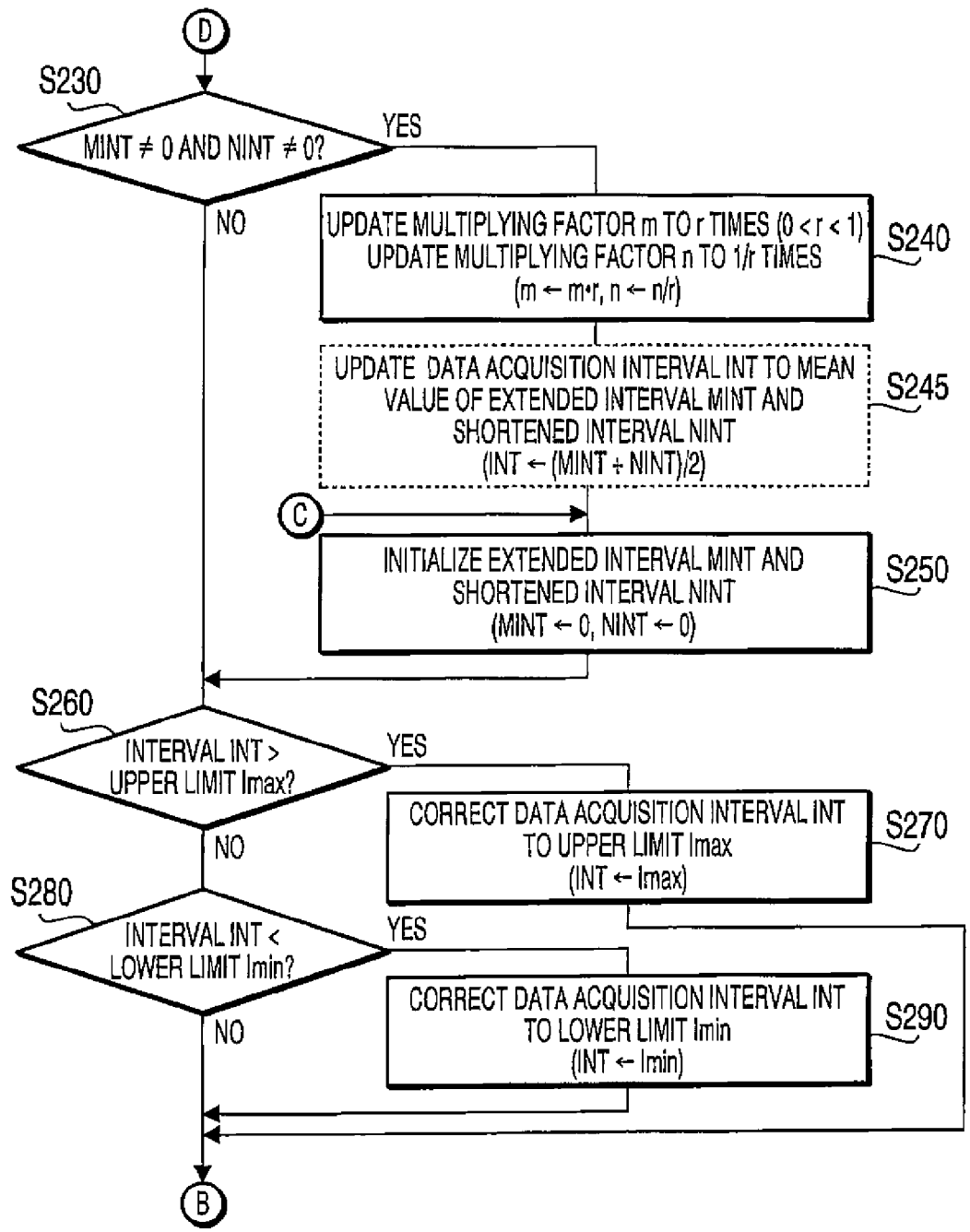

The internal clock correcting process explained above may be executed differently as shown in FIGS. 4 and 5. In the following, an MFP 10 in accordance with a modification of the above embodiment will be explained referring to FIGS. 4 and 5. The MFP 10 in the modification is basically identical with the MFP 10 in the above embodiment except for the contents of the internal clock correcting process, and thus the following explanation will be given focusing on the internal clock correcting process.

Figure 2:
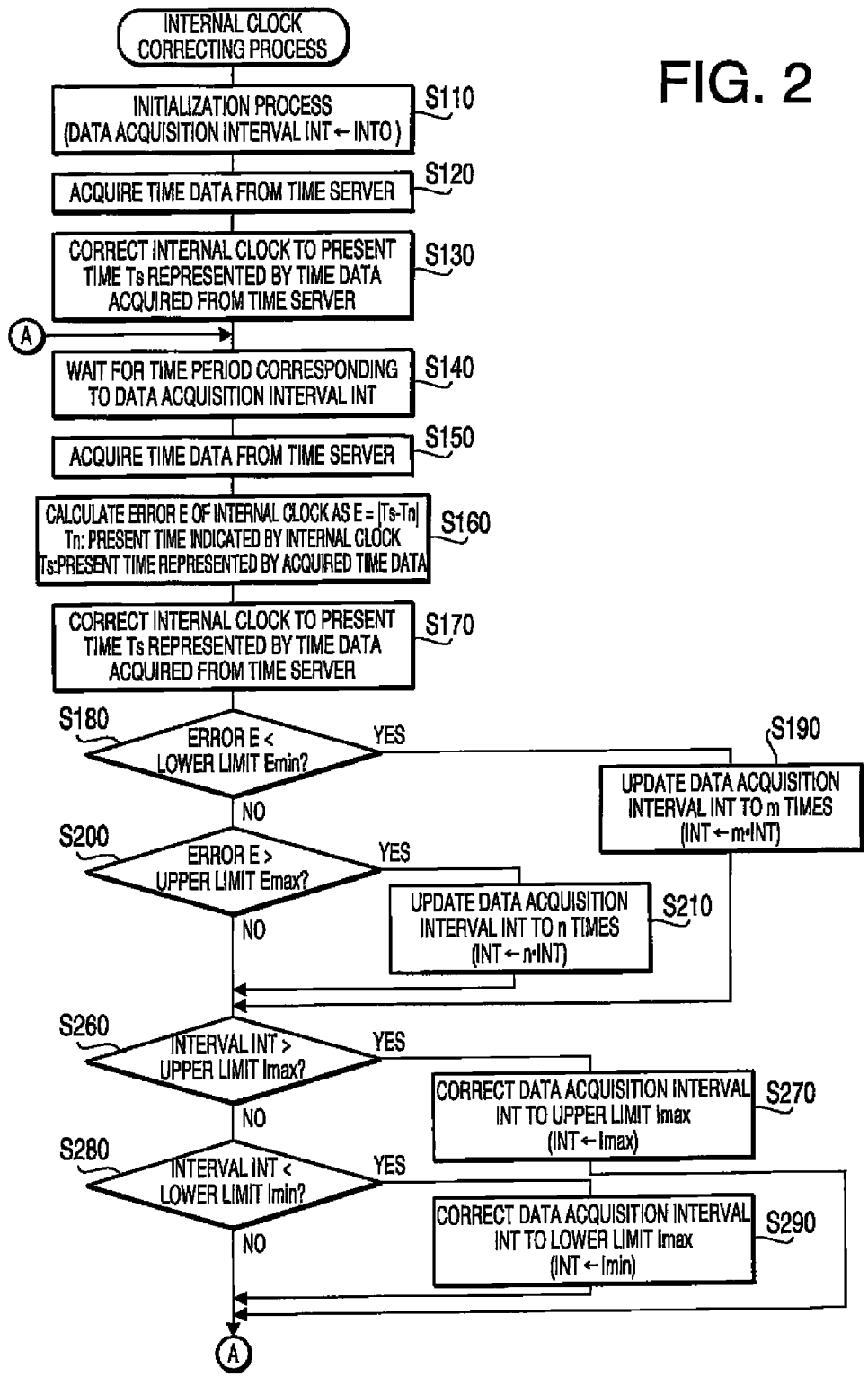
FIG. 2 is a flow chart showing an internal clock correcting process which is executed by a control unit of a digital MFP included in the communication system.

The internal clock correcting process executed by the control unit 11 of the MFP 10 in accordance with the modification is shown in FIGS. 4 and 5, wherein steps identical with those in the internal clock correcting process of FIG. 2 are assigned the same step numbers.

At the start of the internal clock correcting process (modification), the control unit 11 executes an initialization process (S115). In this initialization process, the control unit 11 sets the data acquisition interval INT at the initial value INT0 similarly to the step S110 in FIG. 2 while also initializing other parameters as described below.

Specifically, the control unit 11 initializes parameters "shortened interval NINT" and "extended interval MINT" to 0 (NINT←0, MINT←0) while also initializing the multiplying factors m and n to m0 and n0, respectively (m m0, n n0). Incidentally, the initial values m0 and n0 are assumed to satisfy the same conditions as the multiplying factors m and n in the above embodiment.

After finishing the initialization process (S115), the control unit 11 advances to the step S120 and executes the steps S120-S180 similarly to the above embodiment.

If the error E of the internal clock 50 is less than the lower limit Emin in S180 (S180: YES), the control unit 11 updates the data acquisition interval INT to m times its current value (INT←m·INT) (S190) similarly to the above embodiment, updates the extended interval MINT to the current value of the data acquisition interval INT updated in S190 (MINT←INT) (S195), and thereafter advances to step S230.

On the other hand, if the error E is not less than the lower limit Emin in S180 (S180: NO), the control unit 11 judges whether the error E is larger than the upper limit Emax (S200) similarly to the above embodiment. If the error E is larger than the upper limit Emax (S200: YES), the control unit 11 updates the data acquisition interval INT to n times its current value (INT←n·INT) (S210) similarly to the above embodiment, updates the shortened interval NINT to the current value of the data acquisition interval INT updated in S210 (NINT←INT) (S215), and thereafter advances to the step S230.

If the error E is within the range Emin≦E≦Emax (S200: NO), the control unit 11 advances to step S220 and resets the multiplying factors m and n to the initial values m0 and n0, respectively (m m0, n n0) without updating the data acquisition interval INT.

After finishing the step S220, the control unit 11 initializes the extended interval MINT and the shortened interval NINT to 0 (S250), executes the steps S260-S290 similarly to the above embodiment, and thereafter returns to the step S140. Incidentally, since the update of the data acquisition interval INT is left out in this case where the step S220 is executed, the control unit 11 leaves out the update of the data acquisition interval INT also in the subsequent steps S260-S290 and thereafter returns to the step S140.

On the other hand, when the process has advanced to the step S230, the control unit 11 judges whether both the extended interval MINT and the shortened interval NINT have been set at nonzero values (S230).

This judgment is made in order to check whether or not the error E is oscillating beyond the permissible range (Emin≦E≦Emax) (i.e. alternately taking on values above and below the permissible range). When both the extended interval MINT and the shortened interval NINT have been set at nonzero values, it means that the error E is oscillating beyond the permissible range (Emin≦E≦Emax).

If both MINT and NINT are at nonzero values (S230: YES), the control unit 11 advances to step S240. If either the extended interval MINT or the shortened interval NINT is 0 (S230: NO), the control unit 11 advances to the step S260 (without advancing to the step S240) and executes the steps S260-S290 similarly to the above embodiment, by which the data acquisition interval INT is restricted within the range between the lower limit Imin and the upper limit Imax (Imin≦INT≦Imax) before returning to the step S140.

On the other hand, when the process has advanced to the step S240, the control unit 11 corrects the multiplying factors m and n so that the error E is accommodated in the permissible range (Emin≦E≦Emax) (S240). Specifically, the control unit 11 corrects the multiplying factor m to r times its current value (r: positive value less than 1 which is set in the designing phase) while correcting the multiplying factor n to 1/r times its current value, as follows:

$$m \leftarrow m \cdot r \quad (7)$$

$$n \leftarrow n/r \quad (8)$$

$$r > 1 \quad (9)$$

After finishing the step S240, the control unit 11 updates the data acquisition interval INT to the mean value of the extended interval MINT and the shortened interval NINT (S245) as follows:

$$INT \leftarrow (MINT + NINT)/2 \quad (10)$$

Subsequently, the control unit 11 initializes the extended interval MINT and the shortened interval NINT to 0 (S250). Incidentally, the step S245 may also be left out in the sequence of S240-S250. In the following explanation of the modification, a process (internal clock correcting process) leaving out the step S245 will be called a "first modification" and a process executing the step S245 will be called a "second modification". While details will be explained later, the second modification is capable of accommodating the error E in the permissible range (Emin≦E≦Emax) more quickly compared to the first modification.

In the case where both the extended interval MINT and the shortened interval NINT are at nonzero values, the control unit 11 executes the sequence of S240-S250 as above and thereafter advances to the step S260. Similarly to the above embodiment, the control unit 11 restricts the data acquisition interval INT within the range between the lower limit Imin and the upper limit Imax (Imin≦INT≦Imax) by executing the steps S260-S290 and thereafter returns to the step S140.

Next, examples of the update of the data acquisition interval INT implemented by the internal clock correcting process as the modification and variations in the error E accompanying the update will be explained below referring to FIGS. 6A and 6B.

Figure 6A:
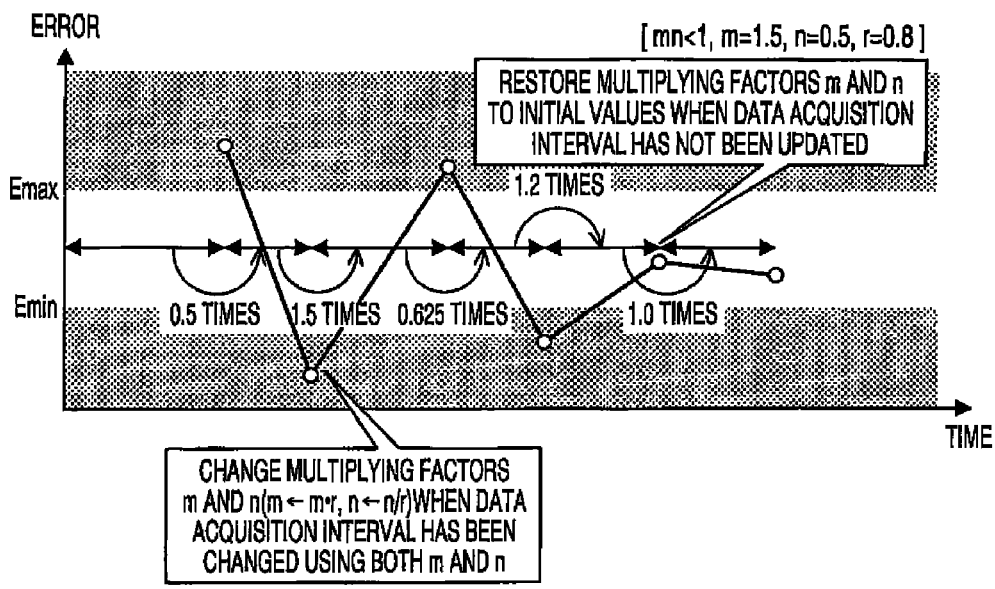
FIG. 6A is a graph showing an example of the update of the data acquisition interval INT implemented by an internal clock correcting process as a first modification and the variations in the error E accompanying the update.

FIG. 6A shows an example of the update of the data acquisition interval INT implemented by the internal clock correcting process as the first modification and the variations in the error E accompanying the update. FIG. 6B shows an example of the update of the data acquisition interval INT implemented by the internal clock correcting process as the second modification and the variations in the error E accompanying the update.

In the example of FIG. 6A, the error E is larger than the upper limit Emax at the point of the first calculation of the error E, and thus the control unit 11 updates the data acquisition interval INT to n·INT0 (by multiplying the initial value INT0 by n) and thereafter executes the next time data acquisition.

However, the error E has fallen below the lower limit Emin at the point of the second calculation. Thus, the control unit 11 updates the data acquisition interval INT to m·N·INT0 (by multiplying the current value of the data acquisition interval INT by m). In this case, the control unit 11 multiplies the multiplying factors m and n (to be used next time) by r and 1/r, respectively (S240).

Specifically, in the example of FIG. 6A in which the initial values m0 and n0 of the multiplying factors m and n have been set at 1.5 and 0.5 (m0=1.5, n0=0.5) and the factor r has been set at 0.8 (r=0.8), the multiplying factors m and n are updated from 1.5 to 1.2 and from 0.5 to 0.625, respectively in the step S240.

In this example, the error E exceeds the upper limit Emax again at the point of the third calculation, and thus the control unit 11 updates the data acquisition interval INT by multiplying it by n again. However, the updated value of the data acquisition interval INT is larger than that in the case where the data acquisition interval INT was multiplied by n0 since the multiplying factor n has previously been updated to a larger value.

Consequently, the error E at the point of the fourth calculation becomes larger compared to a case where the multiplying factor n has not been updated from the initial value n0. In other words, the speed of the convergence of the error E into the permissible range (Emin≦E≦Emax) is increased by the step S240 in the first modification (and in the second modification).

However, the data acquisition interval INT is multiplied by m again in the example of FIG. 6A (in which the error E has fallen below the lower limit Emin again at the point of the fourth calculation). In this case, the error E at the point of the fifth calculation becomes smaller compared to a case where the multiplying factor m has not been multiplied by r. Consequently, the error E enters the permissible range (Emin≦E≦Emax) at the point of the fifth calculation in the example of FIG. 6A.

As above, by the first modification, the error E can be accommodated in the permissible range (Emin≦E≦Emax) quickly and the time correction can be made efficiently through quick stabilization of the data acquisition interval INT.

Figure 6B:
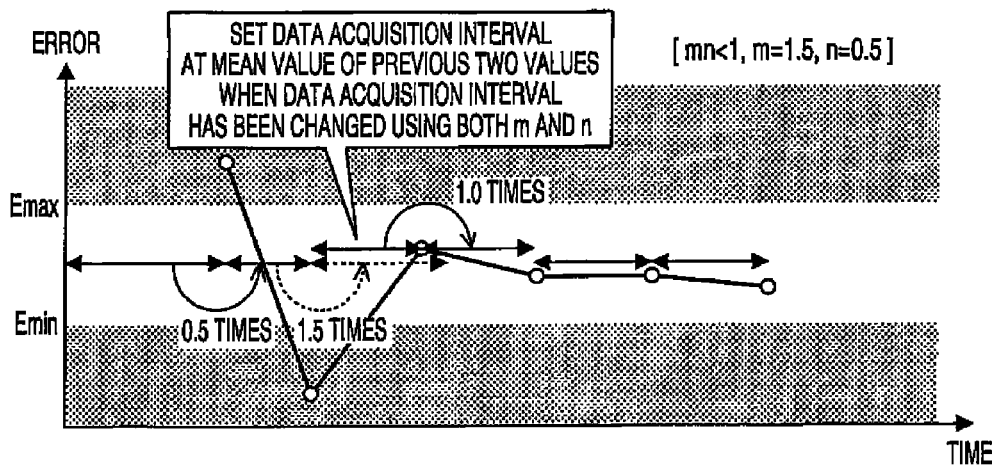
FIG. 6B is a graph showing an example of the update of the data acquisition interval INT implemented by an internal clock correcting process as a second modification and the variations in the error E accompanying the update.

On the other hand, in the second modification, the data acquisition interval INT is set shorter compared to the first modification since the step S245 is executed at the point of the second calculation of the error E as shown in FIG. 6B. Specifically, the data acquisition interval INT is set at (n+m·n)·INT0/2, which is shorter than the value (m·n·INT0) in the first modification since m>1 and n<1.

Consequently, the error E enters the permissible range (Emin≦E≦Emax) at the point of the third calculation. As above, by the second modification, the time correction can be made more efficiently through the still quicker stabilization of the data acquisition interval INT compared to the first modification.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, the present invention is applicable not only to MFPs but also to various types of electronics devices.

What is claimed is:

1. A clock device, comprising:
    an internal clock configured to keep time; and
    a processing unit configured to perform the steps of:
        acquiring time information representing present time from an external device at preset time intervals;
        correcting the time kept by the internal clock based on the time information;
        calculating an error of the time kept by the internal clock based on the present time represented by the time information; and
        changing a first set value of the time interval for the acquisition of the time information by the acquiring based on the calculated error, wherein the changing further includes
            updating the first set value of the time interval to a second set value which is m times the first set value when the error is smaller than a first threshold value, and
            updating the first set value of the time interval to a third set value, which is n times the first set value when the error is larger than a second threshold value, the second threshold value being larger than the first threshold value, and
        wherein the multiplying factors m and n are positive values satisfying conditions m>1, n<1 and m·n≠1.

2. The clock device according to claim 1, wherein the multiplying factors m and n further satisfy a condition m·n<1.

3. The clock device according to claim 1, wherein the multiplying factors m and n further satisfy a condition $m^p \cdot n^q \neq 1$ (p, q: arbitrary natural number).

4. The clock device according to claim 1, wherein the processing unit is further configured to perform the step of updating the multiplying factor m to a smaller value and the multiplying factor n to a larger value while letting the factors m and n satisfy the conditions,
- in a first case where the first set value of the time interval has been multiplied by n due to the error getting larger than the second threshold value after multiplying the first set value by m due to the error being smaller than the first threshold value, and
- in a second case where the first set value of the time interval has been multiplied by m due to the error getting smaller than the first threshold value after multiplying the first set value by n due to the error being larger than the second threshold value.

5. The clock device according to claim 4, wherein the step of updating the multiplying factor includes updating the multiplying factor m to the smaller value and the multiplying factor n to the larger value while letting the factors m and n satisfy all the conditions by updating the multiplying factor m to r times its current value ($0<r<1$) and updating the multiplying factor n to $1/r$ times its current value.

6. The clock device according to claim 4, wherein the step of updating the multiplying factor includes restoring the multiplying factors m and n which have been updated so far to initial values when the error has entered a range from the first threshold value to the second threshold value.

7. The clock device according to claim 4, wherein in the first case and in the second case, the step of updating of the multiplying factor includes updating the multiplying factors m and n while also updating the first set value of the time interval to a value, which is a mean value of the first set value at the point after it was multiplied by m and the first set value at the point after it was multiplied by n.

8. The clock device according to claim 1, wherein the step of changing includes setting the time interval within a range between a preset minimum value and a preset maximum value.

9. The clock device according to claim 1, further comprising a communication interface,
- wherein the step of acquiring includes acquiring the time information representing the present time from a time server as a supplier of the time information via the communication interface which is configured to communicate with the time server.

10. A computer-readable storage medium storing computer-readable instructions that, when executed by a computer cause the computer, to perform the steps of:
- acquiring time information representing present time from an external device at preset time intervals;
- correcting time kept by an internal clock based on the time information;
- calculating an error of the time kept by the internal clock based on the present time represented by the time information; and
- changing a first set value of the time interval for the acquisition of the time information by the acquiring step based on the error calculated by the calculating step, the changing step further including
  - updating the first set value of the time interval to a second set value, which is m times the first set value when the error is smaller than a first threshold value, and
  - updating the first set value of the time interval to a third set value, which is n times the first set value when the error is larger than a second threshold value, the second threshold value being larger than the first threshold value, and
- wherein the multiplying factors m and n are positive values satisfying conditions $m>1$, $n<1$ and $m \cdot n \neq 1$.

11. The computer-readable storage medium according to claim 10, wherein the multiplying factors m and n further satisfy a condition $m \cdot n < 1$.

12. The computer-readable storage medium according to claim 10, wherein the multiplying factors m and n further satisfy a condition $m^p \cdot n^q \neq 1$ (p, q: arbitrary natural number).

13. The computer-readable record medium according to claim 10, further storing computer-readable instructions that, when executed by the computer, cause the computer to perform the step of updating the multiplying factor m to a smaller value and the multiplying factor n to a larger value while letting the factors m and n satisfy the conditions,
- in a first case where the first set value of the time interval has been multiplied by n due to the error getting larger than the second threshold value after multiplying the first set value by m due to the error being smaller than the first threshold value, and
- in a second case where the first set value of the time interval has been multiplied by m due to the error getting smaller than the first threshold value after multiplying the first set value by n due to the error being larger than the second threshold value.

14. The computer-readable storage medium according to claim 13, wherein the multiplying factor updating step updates the multiplying factor m to the smaller value and the multiplying factor n to the larger value while letting the factors m and n satisfy all the conditions by updating the multiplying factor m to r times its current value ($0<r<1$) and updating the multiplying factor n to $1/r$ times its current value.

15. The computer-readable storage medium according to claim 13, wherein the multiplying factor updating step restores the multiplying factors m and n which have been updated so far to initial values when the error has entered a range from the first threshold value to the second threshold value.

16. The computer-readable storage medium according to claim 13, wherein in the first case and in the second case, the multiplying factor updating step updates the multiplying factors m and n while also updating the first set value of the time interval to a value, which is a mean value of the first set value at the point after it was multiplied by m and the first set value at the point after it was multiplied by n.

17. The computer-readable storage medium according to claim 10, wherein the changing step sets the time interval within a range between a preset minimum value and a preset maximum value.

18. The computer-readable storage medium according to claim 10, wherein the acquiring step acquires the time information representing the present time from a time server as a supplier of the time information via a communication interface which is configured to communicate with the time server.

* * * * *